(12) United States Patent
Flosbach et al.

(10) Patent No.: US 7,976,903 B2
(45) Date of Patent: Jul. 12, 2011

(54) NON-AQUEOUS, LIQUID COATING COMPOSITIONS

(75) Inventors: Carmen Flosbach, Wuppertal (DE); Karl-Friedrich Doessel, Wuppertal (DE); Wiebke Becker, Essen (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 310 days.

(21) Appl. No.: 12/161,963

(22) PCT Filed: Jan. 26, 2007

(86) PCT No.: PCT/US2007/002266
§ 371 (c)(1),
(2), (4) Date: Jul. 24, 2008

(87) PCT Pub. No.: WO2007/089643
PCT Pub. Date: Aug. 9, 2007

(65) Prior Publication Data
US 2009/0053421 A1    Feb. 26, 2009

(51) Int. Cl.
*B05D 3/02*    (2006.01)
(52) U.S. Cl. .................... 427/385.5; 524/500; 524/502; 524/507
(58) Field of Classification Search ........................ None
See application file for complete search history.

(56) References Cited

U.S. PATENT DOCUMENTS 7,122,595 B1 * 10/2006 Ott et al. ........................ 524/502
2006/0173122 A1 * 8/2006 Flosbach et al. .............. 524/507

* cited by examiner

*Primary Examiner* — Erma Cameron
(74) *Attorney, Agent, or Firm* — Sudhir G. Deshmukh

(57) ABSTRACT

Non-aqueous, liquid coating compositions which contain at least one epoxy-functional binder A and at least one carboxyl-functional cross-linking resin B, wherein the at least one cross-linking resin B is present as particles having a melting temperature of 40 to 180° C.

19 Claims, No Drawings

NON-AQUEOUS, LIQUID COATING COMPOSITIONS

FIELD OF THE INVENTION

The invention relates to novel non-aqueous, liquid coating compositions which contain epoxy-functional components and carboxyl-functional cross-linking agents.

DESCRIPTION OF THE PRIOR ART

Non-aqueous, liquid coating compositions based on epoxy-functional components and carboxyl-functional cross-linking agents are known, for example, from U.S. Pat. No. 5,686,532, U.S. Pat. No. 6,555,176 B1, U.S. Pat. No. 6,743,867 B1 and from Progress in Organic Coatings, 43 (2001), pages 123-130.

It has now been found that the per se known non-aqueous, liquid coating compositions based on epoxy-functional components and carboxyl-functional cross-linking agents may be improved if they contain, apart from or instead of hitherto conventional carboxyl-functional cross-linking agents, a specific kind of resins with carboxyl groups. In this way, it is, for example, possible to achieve a higher solids content of the coating compositions (even at an identical or slightly higher application viscosity), improved sagging properties (even at elevated temperatures) and improved technological properties, in particular, good stone chip resistance and good scratch resistance, of the coating layers produced with the coating compositions. In particular, an outstanding storage stability of the coating compositions can be achieved.

SUMMARY OF THE INVENTION

In a first embodiment, the invention is directed to non-aqueous, liquid coating compositions which contain at least one epoxy-functional binder A and at least one carboxyl-functional cross-linking resin B (hereinafter and in the claims also "resin B" for short) as the only carboxyl-functional cross-linking component, wherein the at least one cross-linking resin B is present as particles having a melting temperature of 40 to 180° C., in particular, 60 to 160° C.

DETAILED DESCRIPTION OF THE EMBODIMENTS

In a second embodiment of the invention, the coating compositions mentioned above, i.e., the coating compositions corresponding to the first embodiment of the invention, additionally contain at least one carboxyl-functional cross-linking agent C, which is not solid at room temperature and/or is present in dissolved form. Thus, in the second embodiment the invention is directed to non-aqueous, liquid coating compositions which contain at least one epoxy-functional binder A, at least one carboxyl-functional cross-linking resin B and at least one carboxyl-functional cross-linking agent C, wherein the at least one cross-linking resin B is present as particles having a melting temperature of 40 to 180° C., in particular, 60 to 160° C. and wherein the at least one cross-linking agent C is not solid at room temperature and/or is present in dissolved form.

The coating compositions according to the invention are liquid, contain organic solvent(s) and have a solids content of, for example, 40 to 85 wt. %, preferably of 45 to 75 wt. %.

The solids content of the coating compositions consists of the resin solids content and the following optional components: pigments, fillers (extenders) and non-volatile additives.

The resin solids content of the coating compositions corresponding to the first embodiment of the invention comprises the binder solids content comprising the at least one epoxy-functional binder A and the at least one carboxyl-functional cross-linking resin B. In particular, the resin solids content of the coating compositions consists of 30 to 80, preferably 50 to 80 wt. % of the at least one epoxy-functional binder A, 20 to 70, preferably 20 to 50 wt. % of the at least one cross-linking resin B, and 0 to 30 wt. % of one or more components D, wherein the weight percentages add up to 100 wt. %. It is preferred, that the resin solids content does not comprise any component(s) D and that it consists of 30 to 80, preferably 50 to 80 wt. % of the binder solids content consisting of one or more binders A, and 20 to 70, preferably 20 to 50 wt. % of the at least one cross-linking resin B, wherein the weight percentages add up to 100 wt. %.

The resin solids content of the coating compositions corresponding to the second embodiment of the invention comprises the binder solids content comprising the at least one epoxy-functional binder A, and a carboxyl component consisting of the components B and C each having carboxyl groups. In particular, the resin solids content of the coating compositions consists of 30 to 80, preferably 50 to 80 wt. % of the at least one binder A, 20 to 70, preferably 20 to 50 wt. % of the carboxyl component consisting of components B and C, and 0 to 30 wt. % of one or more components D, wherein the weight percentages add up to 100 wt. %. It is preferred, that the resin solids content does not comprise any component(s) D and that it consists of 30 to 80 wt. %, preferably 50 to 80 wt. % of the binder solids content consisting of one or more binders A, and 20 to 70, preferably 20 to 50 wt. % of the carboxyl component consisting of components B and C, wherein the weight percentages add up to 100 wt. %.

The carboxyl component according to the second embodiment of the coating compositions consists of 10 to less than 100 wt. %, preferably 20 to 60 wt. %, of the at least one carboxyl-functional cross-linking resin B and more than 0 to 90 wt. %, preferably 40 to 80 wt. %, of the at least one carboxyl-functional cross-linking agent C, wherein the weight percentages add up to 100 wt. %. The molar ratio between the carboxyl groups from the at least one carboxyl-functional cross-linking agent C and the carboxyl groups from the at least one cross-linking resin B in the coating compositions corresponding to the second embodiment of the invention is, for example, 20:1 to 0.1:1.

The coating compositions according to the invention contain at least one epoxy-functional component A. The epoxy-functional component(s) A are not solid at room temperature but are, for example, liquid, and/or are soluble in an organic solvent (mixture). Epoxy-functional component(s) A soluble in an organic solvent (mixture) are present in dissolved form in the coating compositions containing organic solvent(s). The epoxy-functional components A comprise compounds having at least two epoxy groups per molecule and a calculated epoxy equivalent weight of, for example, 200 to 700, preferably of 250 to 500 und in particular of 300 to 400.

Examples of epoxy-functional components A are conventional di- or polyepoxides, for example, polyglycidyl ethers based on diethylene glycol, dipropylene glycol, polypropylene glycol, bisphenol A or triglycidyl ethers of glycerol. Further examples of di- or polyepoxides are those based on di- or polyglycidyl esters. Examples of these are reaction products prepared from 1-hydroxy-2,3-epoxypropane with phthalic or terephthalic acid to form phthalic or terephthalic acid bis(2,3-epoxypropyl ester) or a diglycidyl ether of bisphenol A with trimellitic anhydride to form polyesters, for example having a number average molar mass of 500 to 2000.

All the number-average molar mass data stated in the present description and the claims are number-average molar masses determined or to be determined by gel permeation chromatography (GPC; divinylbenzene-cross-linked polystyrene as the immobile phase, tetrahydrofuran as the liquid phase, polystyrene standards).

Preferred epoxy-functional components A are conventional epoxy-functional (meth)acrylic copolymers with a branched or unbranched molecular structure, in particular glycidyl (meth)acrylate copolymers. Such epoxy-functional (meth)acrylic copolymers are, for example, stated in greater detail as preferred components B1) in U.S. Pat. No. 6,555,176 B1 and as components B) in U.S. Pat. No. 6,743,867 B1.

The at least one carboxyl-functional cross-linking resin B contained in the coating compositions corresponding to the first as well as to the second embodiment of the invention are different from the at least one carboxyl-functional cross-linking agent C contained only in the coating compositions corresponding to the second embodiment of the invention and therefore, are not to be confused with each other.

The at least one resin B is present in the coating compositions as particles, in particular, with a non-spherical shape, and has a melting temperature of 40 to 180° C., in particular 60 to 160° C. The melting temperatures are not in general sharp melting points, but instead the upper end of melting ranges with a breadth of, for example, 30 to 150° C. The melting ranges and thus, the melting temperatures may be determined, for example, by DSC (differential scanning calorimetry) at heating rates of 10 K/min. The acid value originating from the carboxyl groups of the at least one resin B is, for example, in the range from 50 to 350 mg of KOH/g.

The resins B are insoluble or virtually insoluble in the coating compositions and are present therein as particles. The resins B are only very slightly, if at all, soluble in organic solvents conventional in coatings, the solubility amounting, for example, to less than 10, in particular less than 5 g per liter of butyl acetate at 20° C.

The carboxyl-functional cross-linking resins B may, for example, comprise corresponding polyester resins B or preferably corresponding polyurethane resins B.

Methods for the production of the preferred carboxyl-functional polyurethane resins B are known to the person skilled in the art. Carboxyl-functional polyurethane resins B may, for example, be produced by reacting polyisocyanates with polyols and carboxylic acids with at least one group capable of addition with isocyanate, such as, for example, aminocarboxylic acids and in particular, hydroxycarboxylic acids. When using carboxylic acids with two or more groups capable of addition with isocyanate, such as, for example, dimethylolpropionic acid or dimethylolbutyric acid, polyurethane resins B with lateral carboxyl groups may be produced.

Polyurethane resins B with terminal carboxyl groups are particularly preferred; they may be produced by reacting polyol(s) with polyisocyanate(s) in excess and reacting the excess free isocyanate groups with one or more carboxylic acids with one group capable of addition with isocyanate, such as, for example, monoaminocarboxylic acids and in particular, monohydroxycarboxylic acids.

A further method for the production of the particularly preferred polyurethane resins B with terminal carboxyl groups is, for example, to react polyisocyanate(s) with polyol(s) in excess and to react the excess hydroxyl groups with cyclic carboxylic anhydride.

Polyols suitable for the production of carboxyl-functional polyurethane resins B are not only polyols in the form of low molar mass compounds defined by empirical and structural formula but also oligomeric or polymeric polyols with number-average molar masses of, for example, up to 800, for example, corresponding hydroxyl-functional polyethers, polyesters or polycarbonates; low molar mass polyols defined by an empirical and structural formula are, however, preferred. The person skilled in the art selects the nature and proportion of the polyisocyanates, the polyols and the carboxylic acids with at least one group capable of addition with isocyanate or the polyisocyanates, the polyols and the cyclic carboxylic anhydrides for the production of the carboxyl-functional polyurethane resins B in such a manner that polyurethane resins B with the above-mentioned melting temperatures and the above-mentioned solubility behavior are obtained.

The carboxyl-functional polyurethane resins B may be produced in the presence of a suitable organic solvent (mixture), which, however, makes it necessary to isolate the polyurethane resins B obtained in this manner or remove the solvent therefrom. Preferably, the production of the polyurethane resins B is, however, carried out without solvent and without subsequent purification operations.

Preferred variants of carboxyl-functional polyurethane resins B and the production thereof are described in greater detail below.

In a first preferred variant, the carboxyl-functional polyurethane resins B are linear polyurethanes with terminal carboxyl groups which can be prepared by reacting 1,6-hexane diisocyanate with a diol component and with at least one carboxylic acid with one group capable of addition with isocyanate in the molar ratio $x:(x-1):2$, wherein x means any desired value from 2 to 6, preferably, from 2 to 4, and the diol component is one single diol, in particular, one single (cyclo)aliphatic diol with a molar mass in the range of 62 to 600, or a combination of diols, preferably two to four, in particular, two or three diols, wherein, in the case of a diol combination each of the diols preferably constitutes at least 10 mol % of the diols of the diol component. In the case of a diol combination, it is preferred, that at least 70 mol %, in particular, 100 mol % of the diols are (cyclo)aliphatic diols, each with a molar mass in the range of 62 to 600.

The term "(cyclo)aliphatic" used in the present description and the claims encompasses cycloaliphatic, linear aliphatic, branched aliphatic and cycloaliphatic with aliphatic residues. Diols differing from (cyclo)aliphatic diols accordingly comprise aromatic or aralphatic diols with aromatically and/or aliphatically attached hydroxyl groups. One example is bisphenol A. Diols differing from (cyclo)aliphatic diols may furthermore comprise oligomeric or polymeric diols with number-average molar masses of, for example, up to 800, for example, corresponding polyether, polyester or polycarbonate diols.

1,6-hexane diisocyanate, diol component and the at least one carboxylic acid with one group capable of addition with isocyanate are reacted stoichiometrically with one another in the molar ratio x mol 1,6-hexane diisocyanate:x–1 mol diol:2 mol carboxylic acid with one group capable of addition with isocyanate, wherein x means any desired value from 2 to 6, preferably from 2 to 4.

One single diol, in particular, one single (cyclo)aliphatic diol with a molar mass in the range of 62 to 600 is used as the diol component. It is also possible to use a combination of diols, preferably two to four, in particular, two or three diols, wherein each of the diols preferably constitutes at least 10 mol % of the diols of the diol component and wherein it is further preferred, that at least 70 mol %, in particular 100 mol % of the diols are (cyclo)aliphatic diols, each with a molar mass in the range of 62 to 600.

In the case of the diol combination, the diol component may be introduced as a mixture of its constituent diols or the diols constituting the diol component may be introduced individually into the synthesis. It is also possible to introduce a proportion of the diols as a mixture and to introduce the remaining proportion(s) in the form of pure diol.

Examples of diols which are possible as one single diol of the diol component are ethylene glycol, the isomeric propane- and butanediols, 1,5-pentanediol, 1,6-hexanediol, 1,10-decanediol, 1,12-dodecanediol, 1,4-cyclohexanedimethanol, hydrogenated bisphenol A and dimer fatty alcohol.

Examples of diols which are possible as constituent of the diol component are telechelic (meth)acrylic polymer diols, polyester diols, polyether diols, polycarbonate diols, each with a number-average molar mass of, for example, up to 800 as representatives of oligomeric or polymeric diols, bisphenol A as a representative of low molar mass non-(cyclo)aliphatic diols defined by empirical and structural formula and ethylene glycol, the isomeric propane- and butanediols, 1,5-pentanediol, 1,6-hexanediol, 1,10-decanediol, 1,12-dodecanediol, neopentyl glycol, butylethylpropanediol, the isomeric cyclohexanediols, the isomeric cyclohexanedimethanols, hydrogenated bisphenol A, tricyclodecanedimethanol, and dimer fatty alcohol as representatives of (cyclo)aliphatic diols defined by empirical and structural formula with a low molar mass in the range of 62 to 600.

Preferably, only one carboxylic acid with one group capable of addition with isocyanate is used. Examples of the at least one carboxylic acid with one group capable of addition with isocyanate are in particular monohydroxycarboxylic acids, such as, for example, glycolic acid (hydroxyacetic acid), malic acid, 12-hydroxystearic acid, 4-hydroxybenzoic acid or 1:1-adducts of monoepoxy compounds and dicarboxylic acids, for example, corresponding adducts of glycidyl ethers or glycidyl esters, such as, glycidyl versatate with dicarboxylic acids.

1,6-hexane diisocyanate, the diol(s) of the diol component and the at least one carboxylic acid with one group capable of addition with isocyanate are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. For example, 1,6-hexane diisocyanate may be reacted initially with the at least one carboxylic acid with one group capable of addition with isocyanate and then with the diol(s) of the diol component or initially with the diol(s) of the diol component and then with the at least one carboxylic acid with one group capable of addition with isocyanate. However, the diol component may, for example, also be divided into two or more portions, for example, also into the individual diols, for example, such that 1,6-hexane diisocyanate is reacted initially with part of the diol component before further reaction with the at least one carboxylic acid with one group capable of addition with isocyanate and finally with the remaining proportion of the diol component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvent is complete and the reaction mixture has cooled, solid linear polyurethanes with terminal carboxyl groups are obtained. When low molar mass diols defined by empirical and structural formula are used for synthesis of the linear polyurethanes with terminal carboxyl groups their molar masses calculated with the example of 12-hydroxystearic acid as the only monohydroxycarboxylic acid used are in the range of 998 or above, for example, up to 2500.

The linear polyurethanes with terminal carboxyl groups assume the form of a mixture exhibiting a molar mass distribution. They do not, however, require working up and may be used directly as carboxyl-functional polyurethane resins B.

In a second preferred variant, the carboxyl-functional polyurethane resins B are linear polyurethanes with terminal carboxyl groups which can be prepared by reacting a diisocyanate component, a diol component and at least one carboxylic acid with one group capable of addition with isocyanate in the molar ratio $x:(x-1):2$, wherein x means any desired value from 2 to 6, preferably, from 2 to 4, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from linear aliphatic alpha,omega-C2-C12-diols, wherein each diol of the diol component preferably forms at least 10 mol % within the diol component, and wherein the mol % of the respective diols add up to 100 mol %.

The diisocyanate component, the diol component and the at least one carboxylic acid with one group capable of addition with isocyanate are reacted stoichiometrically with one another in the molar ratio x mol diisocyanate:x−1 mol diol:2 mol carboxylic acid with one group capable of addition with isocyanate, wherein x represents any value from 2 to 6, preferably from 2 to 4.

50 to 80 mol % of the diisocyanate component is formed by 1,6-hexane diisocyanate, and 20 to 50 mol % by one or two diisocyanates selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein if two diisocyanates are selected, each diisocyanate forms at least 10 mol % of the diisocyanates of the diisocyanate component. Preferably, the diisocyanate or the two diisocyanates, forming in total 20 to 50 mol % of the diisocyanate component, are selected from dicyclohexylmethane diisocyanate, isophorone diisocyanate, trimethylhexane diisocyanate, cyclohexane diisocyanate, cyclohexanedimethylene diisocyanate and tetramethylenexylylene diisocyanate.

The diol component consists to an extent of 20 to 100 mol % of at least one linear aliphatic alpha,omega-C2-C12-diol and to an extent of 0 to 80 mol % of at least one diol differing from linear aliphatic alpha,omega-C2-C12-diols. The diol component preferably consists of no more than four different diols, in particular, only of one to three diols. In the case of only one diol, it accordingly comprises a linear aliphatic alpha,omega-C2-C12-diol. In the case of a combination of two, three or four diols, the diol component consists to an extent of 20 to 100 mol %, preferably of 80 to 100 mol %, of at least one linear aliphatic alpha,omega-C2-C12-diol and to an extent of 0 to 80 mol %, preferably of 0 to 20 mol % of at least one diol differing from linear aliphatic alpha,omega-C2-C12-diols and preferably, also from alpha,omega-diols with more than 12 carbon atoms. The at least one diol differing from linear aliphatic alpha,omega-C2-C12-diols and preferably, also from alpha,omega-diols with more than 12 carbon atoms comprises in particular (cyclo)aliphatic diols defined by empirical and structural formula and with a low molar mass in the range of 76 to 600. The proportion of possible non-(cyclo)aliphatic diols preferably amounts to no more than 30 mol % of the diols of the diol component. In the case of a diol combination, each diol preferably makes up at least 10 mol % of the diol component.

Preferably, the diol component does not comprise any non-(cyclo)aliphatic diols. Most preferably, it does not comprise any diols that are different from linear aliphatic alpha,omega-C2-C12-diols, but rather consists of one to four, preferably, one to three, and in particular, only one linear aliphatic alpha,omega-C2-C12-diol.

In the case of the diol combination, the diol component may be introduced as a mixture of its constituent diols or the diols constituting the diol component may be introduced individually into the synthesis. It is also possible to introduce a proportion of the diols as a mixture and to introduce the remaining proportion(s) in the form of pure diol.

Examples of linear aliphatic alpha,omega-C2-C12-diols that may be used as one single diol or as constituent of the diol component are ethylene glycol, 1,3-propanediol, 1,4-butanediol, 1,5-pentanediol, 1,6-hexanediol, 1,10-decanediol and 1,12-dodecanediol.

Examples of diols that are different from linear aliphatic alpha,omega-C2-C12-diols and may be used in the diol component are telechelic (meth)acrylic polymer diols, polyester diols, polyether diols, polycarbonate diols, each with a number-average molar mass of, for example, up to 800 as representatives of oligomeric or polymeric diols, bisphenol A as a representative of low molar mass non-(cyclo)aliphatic diols defined by empirical and structural formula and those isomers of propanediol and butanediol that are different from the isomers of propanediol and butanediol specified in the preceding paragraph, as well as, neopentyl glycol, butyl ethyl propanediol, the isomeric cyclohexanediols, the isomeric cyclohexanedimethanols, hydrogenated bisphenol A, tricyclodecanedimethanol, and dimer fatty alcohol as representatives of (cyclo)aliphatic diols defined by empirical and structural formula with a low molar mass in the range of 76 to 600.

Preferably, only one carboxylic acid with one group capable of addition with isocyanate is used. Examples of the at least one carboxylic acid with one group capable of addition with isocyanate are the same as those stated above as examples in the first preferred variant of carboxyl-functional polyurethane resins B.

The diisocyanates of the diisocyanate component, the diol(s) of the diol component and the at least one carboxylic acid with one group capable of addition with isocyanate are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. For example, the diisocyanates of the diisocyanate component may be reacted initially with the at least one carboxylic acid with one group capable of addition with isocyanate and then with the diol(s) of the diol component or initially with the diol(s) of the diol component and then with the at least one carboxylic acid with one group capable of addition with isocyanate. However, the diol component may, for example, also be divided into two or more portions, for example, also into the individual diols, for example, such that the diisocyanates of the diisocyanate component are reacted initially with part of the diol component before further reaction with the at least one carboxylic acid with one group capable of addition with isocyanate and finally with the remaining proportion of the diol component. In a very similar manner, however, the diisocyanate component may, for example, also be divided into two or more portions, for example, also into the individual diisocyanates, for example, such that the diol component and the at least one carboxylic acid with one group capable of addition with isocyanate are reacted initially with part of the diisocyanate component and finally with the remaining proportion of the diisocyanate component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvent is complete and the reaction mixture has cooled, solid linear polyurethanes with terminal carboxyl groups are obtained. When low molar mass diols defined by empirical and structural formula are used for synthesis of the linear polyurethanes with terminal carboxyl groups their molar masses calculated with the example of 12-hydroxystearic acid as the only monohydroxycarboxylic acid used are in the range of 996 or above, for example, up to 2500.

The linear polyurethanes with terminal carboxyl groups assume the form of a mixture exhibiting a molar mass distribution. They do not, however, require working up and may be used directly as carboxyl-functional polyurethane resins B.

In a third preferred variant, the carboxyl-functional polyurethane resins B are polyurethanes with terminal carboxyl groups which can be prepared by reacting a trimer of a (cyclo)aliphatic diisocyanate, 1,6-hexanediisocyanate, a diol component and at least one carboxylic acid with one group capable of addition with isocyanate in the molar ratio 1:x:x:3, wherein x means any desired value from 1 to 6, preferably, from 1 to 3, wherein the diol component is one single linear aliphatic alpha,omega-C2-C12-diol or a combination of two to four, preferably, two or three, (cyclo)aliphatic diols, wherein in the case of diol combination, each of the diols makes up at least 10 mol % of the diols of the diol combination and the diol combination consists of at least 80 mol % of at least one linear aliphatic alpha,omega-C2-C12-diol.

The trimer of the (cyclo)aliphatic diisocyanate, 1,6-hexanediisocyanate, the diol component and the at least one carboxylic acid with one group capable of addition with isocyanate are reacted stoichiometrically with one another in the molar ratio 1 mol trimer of the (cyclo)aliphatic diisocyanate:x mol 1,6-hexanediisocyanate:x mol diol:3 mol carboxylic acid with one group capable of addition with isocyanate, wherein x represents any value from 1 to 6, preferably from 1 to 3.

The trimer of the (cyclo)aliphatic diisocyanate is polyisocyanates of the isocyanurate type, prepared by trimerization of a (cyclo)aliphatic diisocyanate. Appropriate trimerization products derived, for example, from 1,4-cyclohexanedimethylenediisocyanate, in particular, from isophorondiisocyanate and more particularly, from 1,6-hexanediisocyanate, are suitable. The industrially obtainable isocyanurate polyisocyanates generally contain, in addition to the pure trimer, i.e., the isocyanurate made up of three diisocyanate molecules and comprising three NCO functions, isocyanate-functional secondary products with a relatively high molar mass. Products with the highest possible degree of purity are preferably used. In each case, the trimers of the (cyclo)aliphatic diisocyanates obtainable in industrial quality are regarded as pure trimer irrespective of their content of said isocyanate-functional secondary products with respect to the molar ratio of 1 mol trimer of the (cyclo)aliphatic diisocyanate:x mol 1,6-hexanediisocyanate:x mol diol:3 mol carboxylic acid with one group capable of addition with isocyanate.

One single linear aliphatic alpha,omega C2-C12 diol or combinations of two to four, preferably of two or three, (cyclo)aliphatic diols are used as the diol component. The diol combination preferably consists of two to four, in particular, two or three, linear aliphatic alpha,omega C2-C12 diols.

Examples of one single linear aliphatic alpha,omega C2-C12 diol or linear aliphatic alpha,omega C2-C12 diols which can be used within the diol combination are ethylene glycol, 1,3-propanediol, 1,4-butanediol, 1,5-pentanediol, 1,6-hexanediol, 1,10-decanediol and 1,12-dodecanediol.

Examples of (cyclo)aliphatic diols which can be used within the diol combination in addition to the at least one linear aliphatic alpha,omega C2-C12 diol making up at least 80 mol % of the diol combination are the further isomers of propane and butane diol, different from the isomers of propane and butane diol cited in the preceding paragraph, and neopentylglycol, butylethylpropanediol, the isomeric cyclohexane diols, the isomeric cyclohexanedimethanols, hydrogenated bisphenol A and tricyclodecanedimethanol.

In the case of the diol combination, the mixture of the diols making up the combination can be used in the synthesis process or the diols making up the diol combination are each used individually in the synthesis. It is also possible to use a portion of the diols as a mixture and the remaining fraction(s) in the form of pure diol.

In the case of the diol combination, preferred diol combinations totaling 100 mol % in each case are combinations of 10 to 90 mol % 1,3-propanediol with 90 to 10 mol % 1,5-pentanediol, 10 to 90 mol % 1,3-propanediol with 90 to 10 mol % 1,6-hexanediol and 10 to 90 mol % 1,5-pentanediol with 90 to 10 mol % 1,6-hexanediol.

Preferably, only one carboxylic acid with one group capable of addition with isocyanate is used. Examples of the at least one carboxylic acid with one group capable of addition with isocyanate are the same as those stated above as examples in the first preferred variant of carboxyl-functional polyurethane resins B.

The trimer of the (cyclo)aliphatic diisocyanate, 1,6-hexane-diisocyanate, the diol component and the at least one carboxylic acid with one group capable of addition with isocyanate are preferably reacted together in the absence of solvents. The reactants may here all be reacted together simultaneously or in two or more synthesis stages. Synthesis procedures in which the at least one carboxylic acid with one group capable of addition with isocyanate or the diol component and the trimer of the (cyclo)aliphatic diisocyanate alone are reacted with one another are preferably avoided. When the synthesis is performed in multiple stages, the reactants may be added in the most varied order, for example, also in succession or in alternating manner. For example, 1,6-hexane diisocyanate may be reacted initially with a mixture of diol component and carboxylic acid with one group capable of addition with isocyanate and then with the trimer of the (cyclo)aliphatic diisocyanate or a mixture of the isocyanate-functional components with the diol component and carboxylic acid with one group capable of addition with isocyanate or a mixture of the isocyanate-functional components may be reacted initially with carboxylic acid with one group capable of addition with isocyanate and then with the diol component. In the case of a diol combination, the diol component may, for example, also be divided into two or more portions, for example, also into the individual (cyclo)aliphatic diols. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvents is complete and the reaction mixture has cooled, solid polyurethanes with terminal carboxyl groups and with number average molar masses in the range of 1,500 to 4,000 are obtained. They do not require working up and may be used directly as carboxyl-functional polyurethane resins B.

In a fourth preferred variant, the carboxyl-functional polyurethane resins B are polyurethane dicarboxylic acids which can be prepared by reacting 1,6-hexane diisocyanate with a diol component in the molar ratio x:(x+1), wherein x means any desired value from 1 to 6, preferably, from 2 to 4, and the diol component is one single diol, in particular, one single (cyclo)aliphatic diol with a molar mass in the range of 62 to 600, or a combination of diols, preferably two to four, in particular two or three diols, wherein in the case of a diol combination each of the diols preferably constitutes at least 10 mol % of the diols of the diol component, and wherein the hydroxyl groups of the resultant polyurethane diols are then each reacted with one molecule of cyclic carboxylic anhydride.

In the case of a diol combination, it is preferred, that at least 70 mol %, in particular, 100 mol % of the diols are (cyclo)aliphatic diols, each with a molar mass in the range of 62 to 600.

1,6-hexane diisocyanate and the diol component are reacted stoichiometrically with one another in the molar ratio x mol 1,6-hexane diisocyanate:(x+1) mol diol, wherein x means any desired value from 1 to 6, preferably from 2 to 4.

With regard to the nature and use of the diol component and to the diols possible as constituents, in order to avoid repetition, reference is made to the statements made in relation to the first preferred variant of carboxyl-functional polyurethane resins B.

1,6-hexane diisocyanate and the diol component are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. The diol component may, for example, be divided into two or more portions, for example, such that 1,6-hexane diisocyanate is initially reacted with part of the diol component before further reaction with the remaining proportion of the diol component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction, which is performed without solvent, is complete, the resultant polyurethane diols are reacted with one molecule of cyclic carboxylic anhydride per hydroxyl group and the anhydride is ring-opened.

Preferably, only one cyclic carboxylic anhydride is used. Examples of usable cyclic carboxylic anhydrides are maleic anhydride, succinic anhydride, tetrahydrophthalic anhydride, hexahydrophthalic anhydride, methylhexahydrophthalic anhydride, trimellitic anhydride and pyromellitic anhydride. During the reaction, the terminal hydroxyl groups of the polyurethane diols are esterified and the terminal carboxyl groups of the polyurethane dicarboxylic acids are formed. Addition of the cyclic carboxylic anhydride and the reaction generally proceed in the temperature range from 90 to 140° C., it being possible to monitor the course of the reaction by determining the acid value. The reaction is complete when the theoretical acid value is reached. Once the reaction carried out is complete and the reaction mixture has cooled, solid polyurethane dicarboxylic acids are obtained. When low molar mass diols defined by empirical and structural formula are used for synthesis of the polyurethane dicarboxylic acids, their molar masses calculated with the example of hexahydrophthalic acid anhydride as the only cyclic carboxylic acid anhydride used are in the range of 600 or above, for example, up to 2500.

The polyurethane dicarboxylic acids assume the form of a mixture exhibiting a molar mass distribution. They do not, however, require working up and may be used directly as carboxyl-functional polyurethane resins B.

In a fifth preferred variant, the carboxyl-functional polyurethane resins B are polyurethane dicarboxylic acids which can be prepared by reacting a diisocyanate component and a diol component in the molar ratio x:(x+1), wherein x means any desired value from 1 to 6, preferably, from 2 to 4, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from linear aliphatic alpha,omega-C2-C12-diols, wherein each diol of the diol component preferably forms at least 10 mol % within the diol component, and wherein the mol % of the respective diols add up to 100 mol %, and wherein the hydroxyl groups of the resultant polyurethane diols are then each reacted with one molecule of a cyclic carboxylic anhydride.

The diisocyanate component and the diol component are reacted stoichiometrically with one another in the molar ratio x mol diisocyanate:x+1 mol diol, wherein x represents any value from 1 to 6, preferably from 2 to 4.

With regard to the nature and use of the diisocyanate component, of the diol component and to the diols possible as constituents of the diol component, in order to avoid repetition, reference is made to the statements made in relation to the second preferred variant of carboxyl-functional polyurethane resins B.

The diisocyanates of the diisocyanate component and the diol(s) of the diol component are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. The diol component may, for example, be divided into two or more portions or into individual diols, for example, such that the diisocyanates are initially reacted with part of the diol component before further reaction with the remaining proportion of the diol component. Equally, however, the diisocyanate component may also be divided into two or more portions or into the individual diisocyanates, for example, such that the hydroxyl components are initially reacted with part of the diisocyanate component and finally with the remaining proportion of the diisocyanate component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction, which is performed without solvent, is complete, the resultant polyurethane diols are reacted with cyclic carboxylic anhydride in a similar manner to that already described in the fourth preferred variant of carboxyl-functional polyurethane resins B. Preferably, only one cyclic carboxylic anhydride is used. Examples of usable cyclic carboxylic anhydrides which may be mentioned are the same as those stated in the fourth preferred variant of carboxyl-functional polyurethane resins B. Once the reaction carried out is complete and the reaction mixture has cooled, solid polyurethane dicarboxylic acids are obtained. When low molar mass diols defined by empirical and structural formula are used for synthesis of the polyurethane dicarboxylic acids, their molar masses calculated with the example of hexahydrophthalic acid anhydride as the only cyclic carboxylic acid anhydride used are in the range of 598 or above, for example, up to 2500.

The polyurethane dicarboxylic acids assume the form of a mixture exhibiting a molar mass distribution. They do not, however, require working up and may be used directly as carboxyl-functional polyurethane resins B.

If, in individual cases, a proportion of the diol component used for synthesis of the polyurethane diol intermediates stated above in the context of the fourth and fifth preferred variants of polyurethane resins B is replaced by a triol component comprising at least one triol, polyurethane resins B are obtained which are branched and/or more highly carboxyl-functional compared to the respective polyurethane dicarboxylic acids. Embodiments with such polyurethane resins B are themselves further preferred variants. For example, up to 70% of the diols of the diol component in molar terms may be replaced by the triol(s) of the triol component. Examples of triols usable as constituent(s) of a corresponding triol component are trimethylolethane, trimethylolpropane and/or glycerol. Glycerol is preferably used alone as a triol component.

The at least one resin B is present in particulate form, in particular, in the form of particles with a non-spherical shape, in the coating compositions. The average particle size (mean particle diameter) of the resin B particles determined by means of laser diffraction is, for example, 1 to 100 µm. The resin B particles may be formed by grinding (milling) of the solid resin(s) B; for example, conventional powder coat production technology may be used for that purpose. The resin B particles may either be stirred or mixed as a ground powder into the liquid coating composition or liquid constituents thereof, wherein it is possible subsequently to perform additional wet grinding or dispersing of the resin B particles, for example, by means of a bead mill, in the resultant suspension.

A further method for forming the resin B particles involves hot dissolution of the at least one resin B in a dissolution medium and subsequent resin B particle formation during and/or after cooling. In the case of the second embodiment of the invention, dissolution of the at least one resin B may be performed in particular in a proportion or the entirety of the carboxyl-functional cross-linking agent C with heating, for example, to the melting temperature or above, for example, to temperatures of 40 to above 180° C., whereupon the resin B particles may form during and/or after the subsequent cooling. The cross-linking agent C used as dissolution medium for the at least one cross-linking resin B may here be present liquid as such or as a solution in an organic solvent (mixture). Thorough mixing or stirring is preferably performed during cooling. Dissolution of the at least one resin B may also be performed with heating in an organic solvent (mixture), wherein the formation of the resin B particles, which proceeds during and/or after the subsequent cooling, may proceed in the solvent itself. Here, in case of the second embodiment of the invention, it is also possible to allow the formation of the resin B particles after mixing of the resultant, as yet uncooled solution with the carboxyl-functional cross-linking agent C. By using the method of hot dissolution and subsequent resin B particle formation during and/or after cooling, it is in particular possible to produce resin B particles with average particle sizes at the lower end of the range of average particle sizes, for example, in the range of 1 to 50 μm, in particular 1 to 30 μm.

As already stated, the coating compositions according to the second embodiment of the invention contain at least one carboxyl-functional cross-linking agent C. The carboxyl-functional cross-linking agents C are not solid at room temperature, but instead, for example, liquid, and/or they are soluble in organic solvent (mixture). Carboxyl-functional cross-linking agents C soluble in organic solvent (mixture) are present in dissolved form in the coating compositions containing organic solvent(s). The carboxyl-functional cross-linking agents C comprise compounds with at least two carboxyl groups per molecule, such as, polycarboxylic acids, for example, dimer fatty acids; carboxyl-functional oligomers or polymers, for example, corresponding polyethers, polyesters, (meth)acrylic copolymers or polymers with carboxyl groups linked to the polymer by half ester moieties produced by reaction of polyether polyols, polyester polyols, polyurethane polyols or hydroxyl-functional (meth)acrylic copolymers with cyclic carboxylic anhydride. Carboxyl-functional cross-linking agents C which are in particular suitable are carboxyl-functional (meth)acrylic copolymers and carboxyl-functional polyesters in each case with acid values originating from the carboxyl groups of 15 to 300 mg of KOH/g, as are, for example, described as carboxyl-functional components A) in U.S. Pat. No. 6,555,176 B1 and in U.S. Pat. No. 6,743,867 B1.

Curing of the coating compositions according to the invention is based on the addition of carboxyl groups of B and optionally, C onto the epoxy groups of A to form carboxylic acid ester bonds and hydroxyl groups. The ratio of epoxy groups to carboxyl groups in the coating compositions is, for example, from 2:1 to 0.8:1.

The coating compositions according to the invention may contain one or more components D which contribute towards the resin solids content. The term "components D" encompasses components free of epoxy groups and also free of carboxyl groups. These comprise in particular corresponding resins and/or cross-linking agents. Examples of type D resins are physically drying resins or resins which may be chemically cured by reactions other than by the addition of carboxyl groups onto epoxy groups. Examples of type D cross-linking agents are, in particular, conventional cross-linking agents known to the person skilled in the art, in particular, for coating systems based on hydroxyl-functional binders, such as, for example, transesterification cross-linking agents; amino resin cross-linking agents, such as, melamine-formaldehyde resins; free or blocked polyisocyanate cross-linking agents; trisalkoxycarbonylaminotriazine cross-linking agents. Such cross-linking agents D permit additional cross-linking by reaction with the hydroxyl groups which are formed during curing of the coating compositions on addition of the carboxyl groups of B and optionally, C onto the epoxy groups of A.

One, some or each of components A, B, C and D may contain free-radically polymerizable olefinic double bonds. The coating compositions may then be cured not only by the addition of the carboxyl groups of B and optionally, C onto the epoxy groups of A, but additionally by free-radical polymerization of the olefinic double bonds, in particular, by photochemically induced free-radical polymerization. Such compositions are also known as "dual-cure" coating compositions.

The coating compositions according to the invention contain organic solvent(s) and they have a solids content of, for example, 40 to 85 wt. %, preferably, 45 to 75 wt. %. The organic solvent content is, for example, 15 to 60 wt. %, preferably, 25 to 55 wt. %; the sum of the wt.-% of the solids content and the organic solvent content is here, for example, 90 to 100 wt.-% (any possible difference in the corresponding range of above 0 to 10 wt.-% to make up to the total of 100 wt. % is in general formed by volatile additives). The organic solvents are in particular conventional coating solvents, for example, glycol ethers, such as, butyl glycol, butyl diglycol, dipropylene glycol dimethyl ether, dipropylene glycol monomethyl ether, ethylene glycol dimethylether; glycol ether esters, such as, ethyl glycol acetate, butyl glycol acetate, butyl diglycol acetate, methoxypropyl acetate; esters, such as, butyl acetate, isobutyl acetate, amyl acetate; ketones, such as, methyl ethyl ketone, methyl isobutyl ketone, diisobutyl ketone, cyclohexanone, isophorone; alcohols, such as, methanol, ethanol, propanol, butanol; N-alkyl pyrrolidones, such as, N-methyl pyrrolidone; aromatic hydrocarbons, such as, xylene, Solvesso® 100 (mixture of aromatic hydrocarbons with a boiling range from 155° C. to 185° C.), Solvesso® 150 (mixture of aromatic hydrocarbons with a boiling range from 182° C. to 202° C.) and aliphatic hydrocarbons.

Apart from the solvents, the coating compositions may contain further conventional coating additives, for example, inhibitors, catalysts, levelling agents, wetting agents, anticratering agents, antioxidants and/or light stabilizers. The additives are used in conventional amounts known to the person skilled in the art. In case of dual cure coating compositions, generally used photoinitiators are contained therein.

The coating compositions may also contain transparent pigments, color-imparting and/or special effect-imparting pigments and/or fillers, for example, corresponding to a ratio by weight of pigment plus filler: resin solids content in the range from 0:1 to 2:1. Suitable color-imparting pigments are any conventional coating pigments of an organic or inorganic nature. Examples of inorganic or organic color-imparting pigments are titanium dioxide, iron oxide pigments, carbon black, azo pigments, phthalocyanine pigments, quinacridone pigments and pyrrolopyrrole pigments. Examples of special effect pigments are metal pigments, for example, of aluminum, copper or other metals, interference pigments, such as, for example, metal oxide-coated metal pigments, for example, iron oxide-coated aluminum, coated mica, such as, for example, titanium dioxide-coated mica, graphite effect-imparting pigments, iron oxide in flake form, liquid crystal pigments, coated aluminum oxide pigments, and coated silicon dioxide pigments. Examples of fillers are silicon dioxide, aluminum silicate, barium sulfate, calcium carbonate and talc.

The coating compositions according to the invention are in particular distinguished by storage stability which is unusually long in comparison with hitherto known conventional coating compositions based on epoxy-functional components and carboxyl-functional cross-linking agents.

The coating compositions may be used for the production of single-layer coatings or for the production of one or more coating layers within a multilayer coating, such as, in particular, an automotive multilayer coating, either on an automotive body or on an automotive body part. This may relate to both original and repair coating applications. The coating compositions may in particular be used in pigmented form for the production of a primer surfacer layer or in pigment-free form for the production of an outer clear top coat layer or a transparent sealing layer of a multilayer coating. They may, for example, be used for the production of a clear top coat layer on a previously applied color-imparting and/or special effect-imparting predried base coat layer.

The coating compositions may be applied by means of conventional application methods, in particular, by spraying onto any desired uncoated or precoated substrates, for example, of metal or plastics. The coating compositions may exhibit low application viscosities at a comparatively high resin solids content. This is advantageous in the case of spray application, because it is possible, for example, then to use conventional spray application units, as are used for the application of liquid coatings in industrial coating facilities.

Once applied, layers of the coating compositions may initially be flashed off to remove solvent, for example, for one to five minutes at 20 to 80° C. Thermal curing then proceeds at object temperatures above the melting temperature of the cross-linking resin(s) B contained in the corresponding coating composition, for example, for 5 to 30 minutes at 40 to 200° C., preferably, 80 to 180° C., for example, by baking. If the difference between the melting temperature and the actual curing temperature is sufficiently large, it is possible initially to effect only or substantially only the melting of the resin B particles, before the actual cross-linking subsequently proceeds during and/or after a further increase in temperature to the curing temperature. During and/or after melting the resin B particles the resin B may become incorporated into the resin matrix.

If the coating compositions according to the invention are dual-cure coating compositions, thermal curing is combined with curing by free-radical polymerization of olefinic double bonds induced by irradiation with high-energy radiation, in particular, UV radiation. Thermal curing and radiation curing may here proceed simultaneously or in any desired order. Melting of the resin B particles must, however, be ensured prior to curing.

EXAMPLES

Examples 1a to 1e

Preparation of Polyurethane Dicarboxylic Acids

Polyurethane dicarboxylic acids were produced by reacting HDI (1,6-hexane diisocyanate) or a mixture of HDI and DCMDI (dicyclohexylmethane diisocyanate) with one or more diols and the resultant polyurethane diols were then in a second step reacted with the stoichiometric amount of succinic anhydride (one mol of succinic anhydride per mol OH) in accordance with the following general synthesis method:

One diol or a mixture of diols was initially introduced into a 2 liter four-necked flask equipped with a stirrer, thermometer and column and 0.01 wt. % dibutyltin dilaurate, relative to the initially introduced quantity of diol(s), were added. The mixture was heated to 80° C. HDI or a HDI/DCMDI mixture was then apportioned and a temperature was maintained so that the hot reaction mixture did not solidify. The reaction mixture was stirred until no free isocyanate could be detected (NCO content <0.1%). Thereafter the stoichiometric amount of succinic anhydride was apportioned and a temperature was maintained so that the hot reaction mixture did not solidify. The reaction was performed until the theoretical acid number was reached. The hot melt was then discharged and allowed to cool and solidify.

The melting behavior of the resultant polyurethane dicarboxylic acids was investigated by means of DSC (differential scanning calorimetry, heating rate 10 K/min).

Examples 1a to 1e are shown in Table 1. The Table states which reactants were reacted together in what molar ratios and the final temperature of the melting process measured by DSC is stated in ° C.

TABLE 1

| Ex. | Mols HDI | Mols DCMDI | Mols diol A | Mols diol B | Mols diol C | Mols SA | FT |
|---|---|---|---|---|---|---|---|
| 1a | 2 | | 2 PROP | 1 HEX | | 2 | 117° C. |
| 1b | 2 | | 3 PENT | | | 2 | 135° C. |
| 1c | 3 | | 1.33 PENT | 1.33 PROP | 1.33 HEX | 2 | 108° C. |
| 1d | 1.5 | 0.5 | 1 PROP | 2 HEX | | 2 | 125° C. |
| 1e | 1.5 | 0.5 | 3 PENT | | | 2 | 112° C. |

FT; final temperature of the melting process
HEX: 1,6-hexanediol
PENT: 1,5-pentanediol
PROP: 1,3-propanediol
SA: succinic anhydride Examples 2a to 2c Preparation of Carboxyl-Functional Polyurethanes Carboxyl-functional polyurethanes were produced by reacting HDI with a mixture of GLY (glycerol) and one or more diols and the resultant polyurethane polyols were then in a second step reacted with the stoichiometric amount of succinic anhydride (one mol of succinic anhydride per mol OH) in accordance with the following general synthesis method:

The polyols were initially introduced into a 2 liter four-necked flask equipped with a stirrer, thermometer and column and 0.01 wt. % dibutyltin dilaurate, relative to the initially introduced quantity of polyols, were added. The mixture was heated to 80° C. HDI was then apportioned and a temperature was maintained so that the hot reaction mixture did not solidify. The reaction mixture was stirred until no free isocyanate could be detected (NCO content <0.1%). Thereafter the stoichiometric amount of succinic anhydride was apportioned and a temperature was maintained so that the hot reaction mixture did not solidify. The reaction was performed until the theoretical acid number was reached. The hot melt was then discharged and allowed to cool and solidify.

The melting behavior of the resultant carboxyl-functional polyurethanes was investigated by means of DSC (differential scanning calorimetry, heating rate 10 K/min).

Examples 2a to 2c are shown in Table 2. The Table states which reactants were reacted together in what molar ratios and the final temperature of the melting process measured by DSC is stated in ° C.

TABLE 2

| Ex. | Mols HDI | Mols GLY | Mols Diol A | Mols Diol B | Mols Diol C | Mols SA | FT |
|---|---|---|---|---|---|---|---|
| 2a | 2 | 1 | 2 HEX | | | 3 | 90° C. |
| 2b | 2 | 0.1 | 0.9 HEX | 1 PROP | 1 PENT | 2.1 | 112° C. |
| 2c | 2 | 1 | 1 HEX | 1 PENT | | 3 | 92° C. | cf. Table 1 for abreviations.

Example 3

Production of a Clear Coat Composition and an Outer Clear Coat Layer of a Multi-Layer Coating for Comparison Purposes a) Preparation of a branched epoxy-functional methacrylic copolymer:

A charge of 1963 g of xylene was prepared and heated to reflux with stirring. A mixture of 327.6 g of butyl acrylate, 168.0 g of butyl methacrylate, 260.4 g of styrene, 1239.8 g of glycidyl methacrylate, 20.2 g of acrylic acid and 84.0 g of tertiary-butyl perbenzoate was added dropwise within a period of 5 h. The mixture was then rinsed again with 168 g of xylene. The mixture was then post-polymerized under reflux for 6 h.

b) A clear coat was prepared by mixing 55.6 pbw (parts by weight) of the resin solution obtained in step a), 40.0 pbw of a 70 wt. % solution of a carboxyl-functional polyester (esterification product of trimethylolpropane/1,4-cyclohexane dicarboxylic acid/hexahydrophthalic anhydride/caprolactone with an acid value of 215 mg KOH/g) in xylene/butanol (1:1), 1 pbw Tinuvin® 1130 from Ciba (UV absorber), 1.1 pbw of Tinuvin® 144 from Ciba (light protecting agent), 1 pbw of butylglycol acetate, 5 pbw of butanol and 5 pbw of Solvesso® 100.

The storage stability of the clear coat at 40° C. was determined as follows: The initial flow time according to DIN EN ISO 2431 with a DIN 4 cup at 20° C. was determined (30 seconds). Then the clear coat composition was stored at 40° C. for 2 weeks and the flow time was measured again (78 seconds).

A metal panel provided with a cataphoretic primer and a 35 μm thick hydroprimer surfacer layer applied thereto and baked was spray-coated with a black waterborne base coat in a dry layer thickness of 15 μm, flashed off for 5 minutes at 70° C. and then spray-coated with the clear coat in a vertical position in a wedge shape with a layer thickness gradient from 10 μm to 70 μm dry layer thickness, and after 10 minutes flashing off at room temperature, baking was carried out for 30 minutes at 140° C. (object temperature). The clear coat sag limit was visually determined.

A metal panel provided with a cataphoretic primer and a 35 μm thick hydroprimer surfacer layer applied thereto and baked was spray-coated with a black waterborne base coat in a dry layer thickness of 15 μm, flashed off for 5 minutes at 70° C. and then spray-coated with the clear coat in 40 μm dry layer thickness, and after 10 minutes flashing off at room temperature, baking was carried out for 30 minutes at 140° C. (object temperature). Wash scratching resistance was determined by measurement of the residual gloss before and after reflow in % (ratio of initial gloss of the multi-layer coating to its gloss after wash scratching, gloss measurement at an angle of illumination of 200 in each case; reflow means a one hour exposure of the scratched panel to an object temperature of 60° C. in a laboratory oven). Scratching was carried out using the laboratory-scale Amtec Kistler car-wash (cf. Th. Klimmasch and Th. Engbert, Development of a uniform laboratory test method for assessing the car-wash scratch resistance of automotive top coats, in DFO Proceedings 32, pages 59 to 66, Technologie-Tage, Proceedings of the seminar on Apr. 29 and 30, 1997 in Cologne, published by Deutsche Forschungsgesellschaft für Oberflächenbehandlung e.V., Adersstraβe 94, 40215 Düsseldorf.)

Examples 4a to 4h

Production of Clear Coat Compositions and Outer Clear Coat Layers of Multi-Layer Coatings According to the Invention Solid carboxyl-functional polyurethanes of Examples 1 and 2 were in each case comminuted, ground and sieved by means of grinding and sieving methods conventional for the production of powder coatings and, in this manner, converted into binder powders with an average particle size of 50 μm (determined by means of laser diffraction).

Example 3 was repeated several times wherein part or all of the solution of the carboxyl-functional polyester was replaced by a pulverulent carboxyl-functional polyurethane prepared according to the procedure described in the preceding paragraph. The replacement was performed by substituting the pulverulent carboxyl-functional polyurethane for the solution of the carboxyl-functional polyester in each case according to a 10 mol-%, in a second series in each case according to a 20 mol-% and in a third series in each case according to a 100 mol-% substitution of COOH. Where necessary, the initial flow time was adjusted to the same value as in Example 3.

Storage stability, sag limit and wash scratching resistance were determined under the same conditions as in Example 3.

Table 3 shows the storage stability, the measured sag limit in μm and the wash scratching resistance, with reference to Examples 3 and 4a to 4h in each case for a 10 mol-%, a 20 mol-% or a 100 mol % substitution of COOH. The first stated value in each case here relates to the 10 mol-%, the second value to the 20 mol-% and the third value to the 100 mol-% substitution.

TABLE 3

| Examples (carboxyl-funct. polyurethane powder used) | Storage stability (flow time after 2 weeks storage at 40° C.; seconds) | Sag limit (μm) | Residual gloss before reflow (%) | Residual gloss after reflow (%) |
|---|---|---|---|---|
| 3 (./.) | 78 | 30 | 25 | 40 |
| 4a (1a) | 70; ./.; ./. | 34; ./.; ./. | 38; ./.; ./. | 45; ./.; ./. |
| 4b (1b) | ./.; 62; 39 | ./.; 34; 39 | ./.; 38; 48 | ./.; 49; 55 |
| 4c (1c) | 65; 56; 37 | ./.; 35; ./. | ./.; 41; ./. | ./.; 54; ./. |
| 4d (1d) | 68; 53; 39 | 34; 35; 37 | 28; 43; 47 | 43; 55; 61 |
| 4e (1e) | 71; ./.; ./. | 33; ./.; ./. | 34; ./.; ./. | 46; ./.; ./. |
| 4f (2a) | ./.; 65; 48 | ./.; 36; 36 | ./.; 42; 52 | ./.; 58; 62 |

TABLE 3-continued

| Examples (carboxyl-funct. polyurethane powder used) | Storage stability (flow time after 2 weeks storage at 40° C.; seconds) | Sag limit (μm) | Residual gloss before reflow (%) | Residual gloss after reflow (%) |
|---|---|---|---|---|
| 4g (2b) | ./.; 57; ./. | ./.; 37; ./. | ./.; 45; ./. | ./.; 63; ./. |
| 4h (2c) | ./.; 67; 48 | ./.; 35; 39 | ./.; 40; 45 | ./.; 51; 56 |

What is claimed is:

1. Non-aqueous, liquid coating compositions which contain at least one epoxy-functional binder A and at least one carboxyl-functional cross-linking resin B is present as particles having a melting temperature of 40 to 180° C.

2. The coating compositions of claim 1, wherein the resin solids content of the coating compositions consists of 30 to 80 wt. % of the one epoxy-functional binder A, 20 to 70 wt. % of the cross-linking resin B, and 0 to 30 wt. % of one or more components D that are physically drying resins or resins which may be chemically cured by reactions other than by the addition of carboxyl groups onto epoxy groups, wherein the weight percentages add up to 100 wt. %.

3. The coating compositions of claim 2 further comprising at least one carboxyl-functional cross-linking agent C which is not solid at room temperature and/or is present in dissolved form.

4. The coating compositions of claim 3, wherein the resin solids content of the coating compositions consists of 30 to 80 wt. % of the binder A, 20 to 70 wt. % of the carboxyl-functional cross-linking resin B and carboxyl-functional cross-linking agent C, and 0 to 30 wt. % of one or more said components D, wherein the weight percentages add up to 100 wt. %.

5. The coating compositions of claim 4 comprising 10 to 100 wt. % of the carboxyl-functional cross-linking resin B and 0 to 90 wt. % of the carboxyl-functional cross-linking agent C, wherein the weight percentages add up to 100 wt. %.

6. The coating compositions of any one of the preceding claims, wherein the solids content is 40 to 85 wt. %, organic solvent content is 15 to 60 wt. % and the sum of the wt.-% of the solids content and the organic solvent content is 90 to 100 wt.-% and wherein the solids content consists of the resin solids content and the optional components: pigments, fillers and non-volatile additives.

7. The coating compositions of claim 6, wherein the melting temperature of the at least one resin B is at a 30 to 150° C. melting range.

8. The coating compositions of claim 6, wherein the solubility of the at least one resin B is less than 10 g per liter of butyl acetate at 20° C.

9. The coating compositions of claim 6, wherein the average particle size of the resin B particles determined by means of laser diffraction is 1 to 100 μm.

10. The coating compositions of claim 6, wherein the resin B particles are formed by grinding of the at least one solid resin B or by hot dissolution of the at least one resin B in a dissolution medium and subsequent resin B particle formation during and/or after cooling.

11. The coating compositions of claim 6, wherein the at least one resin B is selected from the group consisting of polyester resins B and polyurethane resins B.

12. The coating compositions of claim 11, wherein the at least one resin B is a polyurethane resin B.

13. The coating compositions of claim 12, wherein the polyurethane resin B is a linear polyurethane with terminal carboxyl groups which is prepared by reacting 1,6-hexane diisocyanate with a diol component and with at least one carboxylic acid with one group capable of addition with isocyanate in the molar ratio x:(x−1):2, wherein x means any desired value from 2 to 6, and the diol component is one single diol or a combination of diols.

14. The coating compositions of claim 12, wherein the polyurethane resin B is a linear polyurethane with terminal carboxyl groups which is prepared by reacting a diisocyanate component, a diol component and at least one carboxylic acid with one group capable of addition with isocyanate in the molar ratio x:(x−1):2, wherein x means any desired value from 2 to 6, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from linear aliphatic alpha,omega-C2-C12-diols, wherein the mol % of the respective diols add up to 100 mol %.

15. The coating compositions of claim 12, wherein the polyurethane resin B is a polyurethane with terminal carboxyl groups which is prepared by reacting a trimer of a (cyclo) aliphatic diisocyanate, 1,6-hexanediisocyanate, a diol component and at least one carboxylic acid with one group capable of addition with isocyanate in the molar ratio 1:x:x:3, wherein x means any desired value from 1 to 6, wherein the diol component is one single linear aliphatic alpha,omega-C2-C12-diol or a combination of two to four (cyclo)aliphatic diols, wherein in the case of diol combination, each of the diols makes up at least 10 mol % of the diols of the diol combination and the diol combination consists of at least 80 mol % of at least one linear aliphatic alpha,omega-C2-C12-diol.

16. The coating compositions of claim 12, wherein the polyurethane resin B is a polyurethane dicarboxylic acid which is prepared by reacting 1,6-hexane diisocyanate with a diol component in the molar ratio x:(x+1), wherein x means any desired value from 1 to 6, and the diol component is one single diol or a combination of diols, wherein the hydroxyl groups of the resultant polyurethane diols are then each reacted with one molecule of cyclic carboxylic anhydride.

17. The coating compositions of claim 12, wherein the polyurethane resin B is a polyurethane dicarboxylic acid which is prepared by reacting a diisocyanate component and a diol component in the molar ratio x:(x+1), wherein x means any desired value from 1 to 6, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from linear aliphatic alpha,omega-C2-C12-diols, wherein the mol % of the respective diols add up to 100 mol %, and wherein the hydroxyl groups of the resultant polyurethane diols are then each reacted with one molecule of a cyclic carboxylic anhydride.

18. The coating compositions of claim 16, wherein a proportion of the diol component is replaced by a triol component comprising at least one triol.

19. A process for the preparation of a coating layer, comprising the successive steps:
 1) applying a coating layer from a coating composition of claims 6, and
 2) thermally curing the coating layer at a temperature above the melting temperature of the at least one resin B.

\* \* \* \* \*